United States Patent
Kobayashi et al.

(10) Patent No.: US 9,369,649 B2
(45) Date of Patent: Jun. 14, 2016

(54) IMAGING APPARATUS, IMAGING SYSTEM, AND METHOD FOR DRIVING IMAGING APPARATUS

(71) Applicant: CANON KABUSHIKI KAISHA, Tokyo (JP)

(72) Inventors: Daisuke Kobayashi, Kawaguchi (JP); Tomoya Onishi, Ayase (JP); Takeru Ohya, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 14/189,317

(22) Filed: Feb. 25, 2014

(65) Prior Publication Data
US 2014/0240570 A1 Aug. 28, 2014

(30) Foreign Application Priority Data
Feb. 26, 2013 (JP) ................................ 2013-035882

(51) Int. Cl.
*H04N 5/335* (2011.01)
*H03M 1/00* (2006.01)
*H03M 1/12* (2006.01)
*H01L 27/00* (2006.01)
*H04N 5/3745* (2011.01)

(52) U.S. Cl.
CPC .................................. *H04N 5/37455* (2013.01)

(58) Field of Classification Search
CPC ....... H03M 1/001; H04N 3/155; H04N 5/355; H04N 5/378; H04N 5/37457; H04N 5/37455
USPC ........ 348/308, 310; 250/208.1; 257/291, 292, 257/294, 440, 443–448; 341/126, 135, 155, 341/164, 165
See application file for complete search history.

(56) References Cited

U.S. PATENT DOCUMENTS

| | | | | |
|---|---|---|---|---|
| 2005/0104981 A1* | 5/2005 | Findlater | .............. | H05N 5/3658 348/241 |
| 2006/0186504 A1* | 8/2006 | Bae | ........................ | H04N 5/3651 257/462 |
| 2007/0285300 A1* | 12/2007 | Peizerat | .................. | H03M 1/18 341/157 |
| 2009/0244346 A1* | 10/2009 | Funaki | ............... | H04N 5/37455 348/308 |
| 2010/0194951 A1* | 8/2010 | Peizerat | ................. | H04N 5/335 348/306 |
| 2012/0307100 A1* | 12/2012 | Iwane | .................... | H04N 5/335 348/222.1 |
| 2013/0258127 A1* | 10/2013 | Jang | ................... | H04N 5/23293 348/220.1 |

FOREIGN PATENT DOCUMENTS

JP 2006-203736 A 8/2006

* cited by examiner

*Primary Examiner* — Sinh Tran
*Assistant Examiner* — Xi Wang
(74) *Attorney, Agent, or Firm* — Canon USA Inc. IP Division

(57) ABSTRACT

There are provided an imaging apparatus, an imaging system, and a method for driving the imaging apparatus, which include a pixel including a conversion unit and an AD conversion unit for converting a signal output from the conversion unit into a digital signal, a first bias line electrically connected to the conversion unit, and a capacitance element for storing the voltage based on the potential of the first bias line, wherein the AD conversion unit is driven by the voltage stored in the capacitance element.

15 Claims, 7 Drawing Sheets

IMAGING APPARATUS, IMAGING SYSTEM, AND METHOD FOR DRIVING IMAGING APPARATUS

BACKGROUND

1. Technical Field

The present disclosure relates to an imaging apparatus and an imaging system which convert incident rays into electric charges, and a method for the driving imaging apparatus.

2. Description of the Related Art

An imaging apparatus that can convert incident rays into electric charges has been known. As an example of such an imaging apparatus, Japanese Patent Application Laid-Open No. 2006-203736 discusses an imaging apparatus including pixels each including a photoelectric conversion unit and an analog-to-digital (AD) conversion unit. The photoelectric conversion unit converts incident light into electric charges and the analog to digital (AD) conversion unit converts signals output from the photoelectric conversion unit into digital signals.

SUMMARY

According to an aspect of the present invention, an imaging apparatus includes a pixel including a conversion unit configured to generate an electric charge based on an incident ray and an AD conversion unit configured to convert a signal based on the electric charge generated by the conversion unit into a digital signal, a first bias line electrically connected to the conversion unit, and a capacitance element configured to store a voltage based on a potential applied to the first bias line, wherein the AD conversion unit is driven by the voltage stored in the capacitance element.

According to an aspect of the present invention, a method for driving an imaging apparatus which includes a pixel including a conversion unit configured to generate an electric charge based an incident ray and an AD conversion unit configured to convert a signal based on the electric charge generated by the conversion unit into a digital signal, a first bias line configured to apply a common potential to the conversion unit and the AD conversion unit, and a capacitance element, includes storing a voltage in the capacitance element based on a potential applied to the first bias line, and driving the AD conversion unit based on the voltage stored in the capacitance element.

Further features of the present invention will become apparent from the following description of exemplary embodiments with reference to the attached drawings.

DESCRIPTION OF THE EMBODIMENTS

A bias line for providing electric potential to the conversion unit for generating electric charges based on incident rays and the AD conversion unit is sometimes electrically connected with the conversion unit for generating electric charges based on incident rays and the AD conversion unit in common. In this case, a problem arises in which fluctuations in the electric potential of the bias line caused by the operation of the conversion unit for generating electric charges based on incident rays decrease an AD conversion accuracy of the AD conversion unit.

The present invention is directed to an imaging apparatus, an imaging system, and a method for driving the imaging apparatus capable of solving the above-described problems.

Exemplary embodiments are described below with reference to the attached drawings.

Figure 1A:
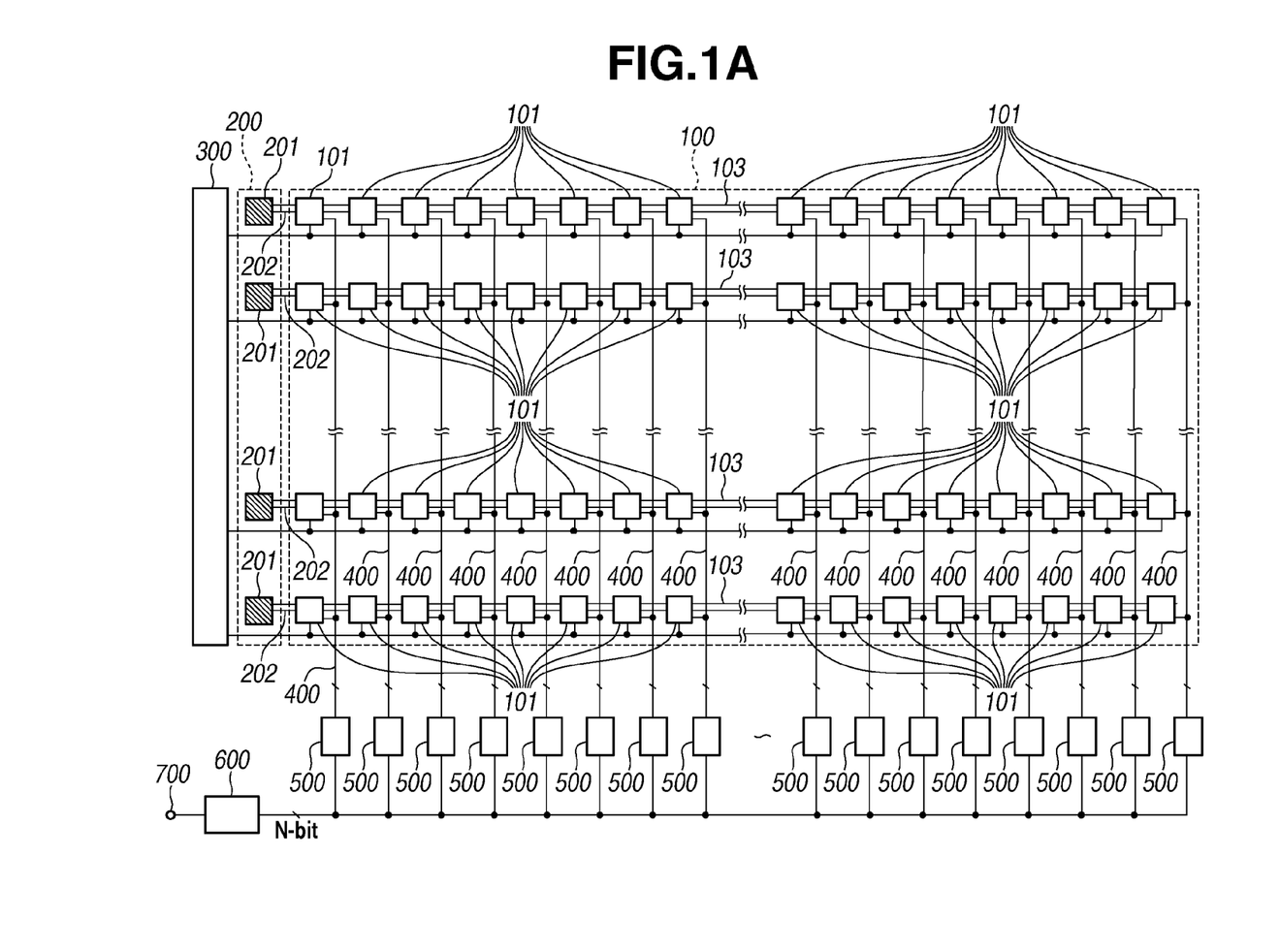
FIG. 1A is a schematic diagram illustrating a configuration of an imaging apparatus.

FIG. 1A is a schematic diagram illustrating a configuration of the imaging apparatus according to the present exemplary embodiment.

A pixel array 100 illustrated in FIG. 1A includes pixels 101 arranged in M rows by N columns. A bias circuit group 200 includes bias circuits 201 for driving pixels 101. In the present exemplary embodiment, the bias circuit 201 is arranged for each row. The bias circuit 201 for each row applies a bias voltage to the pixels 101 in the row corresponding to the bias circuit 201. The pixels 101 output digital signals to signal storage units 500 via output lines 400. The signal storage units 500 sequentially output digital signals to the output unit 600 using a horizontal scanning circuit (not illustrated). The output unit 600 outputs a digital signal to an output node 700 electrically connected to an external unit of the imaging apparatus.

Figure 1B:
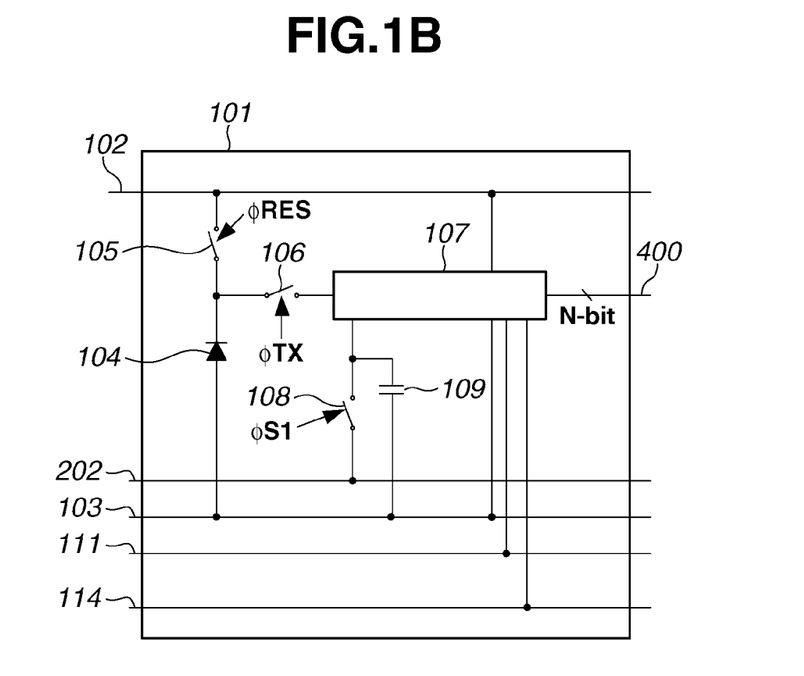
FIG. 1B is a diagram illustrating an example of a configuration of a pixel.

FIG. 1B is a diagram illustrating a configuration of the pixel 101 illustrated in FIG. 1A. The pixel 101 includes a power supply voltage supply line 102, a ground (GND) potential supply line 103, a photo diode 104, switches 105 and 106, an AD conversion unit 107, a switch 108, a capacitance element 109, and an output line 400. A ground voltage is applied to the GND potential supply line 103. The switch 105 conducts when a signal φRES is in a high level (hereinafter referred to as H level). The switch 106 conducts when a signal φTX is in a high level. The switch 108 conducts when a signal φS1 is in a high level. The signals φRES, φTX, and φS1 are signals provided by a timing generator (not illustrated). A count signal line 111 and a control signal line 114 are electrically connected to the AD conversion unit 107. The photo diode 104 is a conversion unit for generating an electric charge based on the incident rays in the present exemplary embodiment. The photo diode 104 according to the present exemplary embodiment is also a photoelectric conversion unit for generating electric charges by photoelectrically converting incident light.

Figure 2A:
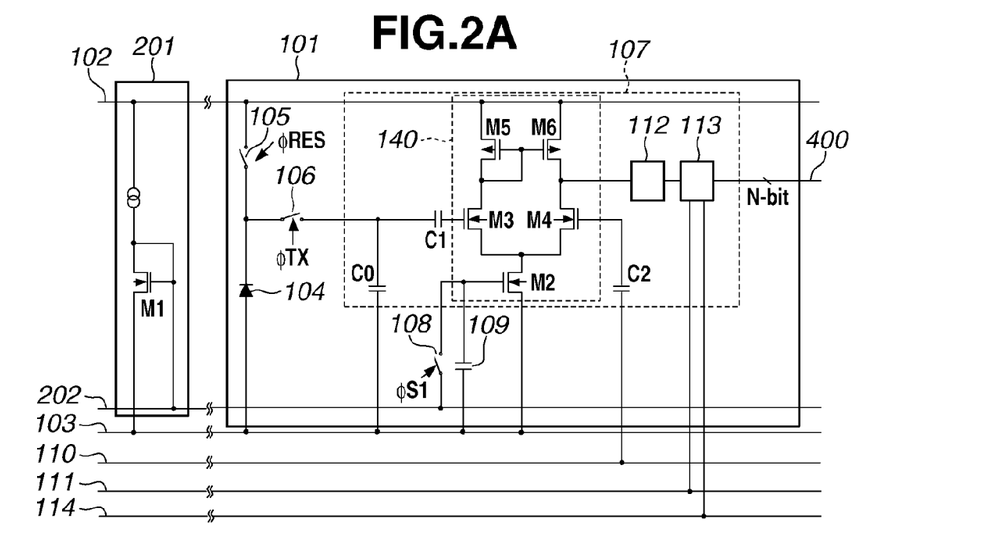
FIG. 2A is a circuit diagram illustrating an example of a configuration of a bias circuit group and a pixel.

FIG. 2A is a diagram illustrating an example of a configuration of the bias circuit 201 and the AD conversion unit 107 according to the present exemplary embodiment. The bias voltage generated by the bias circuit 201 is applied to a bias line 202. The AD conversion unit 107 includes capacitance elements C0, C1, and C2. The AD conversion unit 107 includes a comparator 140 including metal oxide semiconductor (MOS) transistors M2, M3, M4, M5, and M6. The MOS transistor M3 is a first input transistor to which a signal output by the photo diode 104 is given. The MOS transistor M4 is a second input transistor to which a ramp signal (VRAMP) is given as a reference signal. The comparator 140 compares a signal output from the photo diode 104 with the ramp signal (VRAMP) given by a vertical control circuit 300 via a ramp signal line 110 and the capacitance element C2, and outputs a comparison result signal to a latch unit 112. The AD conversion unit 107 includes a latch unit 112 which outputs a signal LATCH to a memory unit 113 based on the comparison result signal output from the comparator 140. The vertical control circuit 300 provides a count signal in which a clock pulse is counted for the memory unit 113 via the count signal line 111. The vertical control circuit 300 outputs a signal φMEM to the memory unit 113 via the control signal line 114. The MOS transistor M2 is a current supply transistor operating as a current source driving the comparator 140. One node of the capacitance element 109 is electrically connected to the control node of the MOS transistor M2. One main node of the MOS transistor M2 is electrically connected to the GND potential supply line 103. The other main node of the MOS transistor M2 is electrically connected to the MOS transistors M3 and M4. The GND potential supply line 103 is a first bias line according to the present exemplary embodiment. The bias line 202 is a second bias line according to the present exemplary embodiment. The ramp signal VRAMP is a reference signal according to the present exemplary embodiment.

The operation of the pixel illustrated in FIG. 2A is described below with reference to FIG. 2B.

Before a reset period, a signal φS1 is set to L level from H level. Thereby, the capacitance element 109 stores voltage based on a potential difference between the bias line 202 and the GND potential supply line 103 at the L level of the signal φS1. The AD conversion unit 107 illustrated in FIG. 2A is driven based on the voltage stored in the capacitance element 109 and the potential of the GND potential supply line 103. Furthermore, the current source of the comparator 140 of the AD conversion unit 107 is driven by the voltage stored in the capacitance element 109 and the potential of the GND potential supply line 103.

In the reset period, the signal φRES is set to H level and the signal φTX is set to H level. Thereby, the charge of the photo diode 104 and the charge of one node of each of the capacitance elements C0 and C1 are reset.

The signal φTX is set to L level and the signal φRES is set to L level. When the signal φRES is set to L level, the photo diode 104 accumulates electric charges generated by photo-electrically converting incident light. A period during which the charges are accumulated is an accumulation period.

After the accumulation period is ended, the signal φTX is set to H level and then to L level. Thereby, the charge accumulated in the photo diode 104 is transferred to the capacitance elements C0 and C1, and the signal based on the transferred charge is provided to the control node of the MOS transistor M3.

When the signal φTX is set to L level, the vertical control circuit 300 starts to change depending on the time of potential of the ramp signal line 110 as an AD conversion period. The vertical control circuit 300 outputs a count signal to the AD conversion unit 107 via the count signal line 111.

When the signal output from the comparator 140 is changed, the latch unit 112 sets the signal value of a signal φLATCH to H level. The memory unit 113 stores a count signal value at the H level of the signal φLATCH. The stored count signal value is a digital signal based on the charge accumulated in the photo diode 104.

The vertical control circuit 300 ends changing of potential depending on the time of the ramp signal VRAMP to finish the AD conversion period.

The vertical control circuit 300 sets the signal φMEM to H level. The memory unit 113 outputs the digital signal stored in the memory unit 113 to a signal storage unit 500 via the output line 400.

The vertical control circuit 300 sets the signal φS1 to H level.

The potential of the GND potential supply line 103 fluctuates along with the reset operation and the accumulation operation of the photo diode 104. On the other hand, the potential of the bias line 202 is kept constant. If the control node of the MOS transistor M2 is directly connected to the bias line 202, fluctuations in the potential of the GND potential supply line 103 fluctuate the voltage between the gate and the source of the MOS transistor M2 to fluctuate drain current, i.e., the driving current of the comparator 140. Fluctuation in the driving current of the comparator 140 fluctuates the operating point of the comparator 140 to lower accuracy in comparison operation. Lowering accuracy in comparison operation lowers accuracy in AD conversion of the AD conversion unit 107 to lower linearity in analog-to-digital conversion characteristic of the AD conversion unit 107. The amount of fluctuation in potential of the GND potential supply line 103 for each pixel 101 is different because of difference in transient response due to the impedance of the GND potential supply line 103. This differentiates accuracy in AD conversion of the AD conversion unit 107 for each pixel to lower image quality of the image generated by the imaging apparatus. Fluctuation in the GND potential generated by the operation of the pixel 101 lowers accuracy in AD conversion of the other pixels 101 among the pixels 101 sharing the GND potential supply line 103.

On the other hand, a standby period is provided during which the potential of the GND potential supply line 103 is stabilized to prevent a high speed operation of the imaging apparatus.

In the present exemplary embodiment, the capacitance element 109 stores the voltage based on a potential difference between the bias line 202 and the GND potential supply line 103. This fluctuates also the potential of the control node of the MOS transistor M2 according to fluctuation in the potential of the GND potential supply line 103. This makes it difficult for the voltage between the gate and the source of the MOS transistor M2 to fluctuate, which also makes it difficult for the drain current flowing into the comparator 140 to fluctuate. This allows the AD conversion unit 107 to be insusceptible to fluctuation in the potential of the GND potential supply line 103 without providing the standby period during which the potential of the GND potential supply line 103 is stabilized.

Figure 2B:
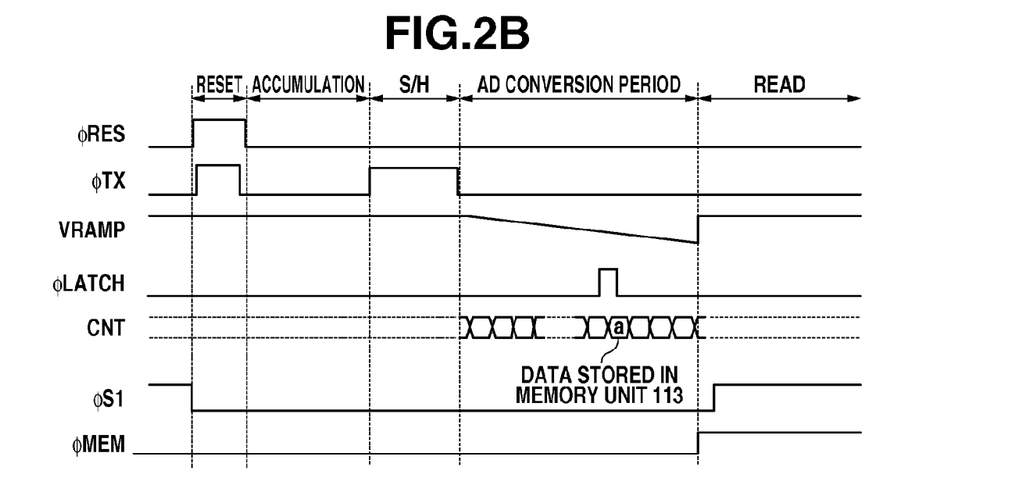
FIGS. 2B and 2C illustrate examples of operation of the pixel.
Figure 2C:
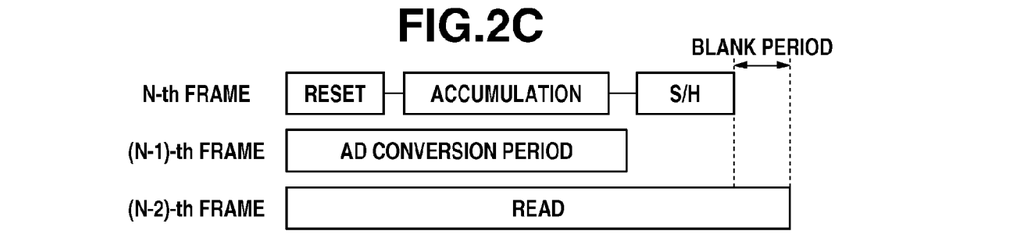

As illustrated in FIG. 2C, if operation inside a frame is performed in parallel by a plurality of frames to increase a frame rate, the photo diode 104 and the AD conversion unit 107 are operated in parallel, so that fluctuation in the GND potential supply line 103 exerts a significant influence. Also in this case, a signal is stored based on a potential difference between the bias line 202 and the GND potential supply line 103 in a blank period such as reading period to enable the AD conversion unit 107 to be insusceptible to fluctuation in the potential of the GND potential supply line 103.

The waveform of the signal φS1 according to the present exemplary embodiment is not limited to the waveform illustrated in FIG. 2B. If the signal φS1 is set to L level from H level before the AD conversion period starts, the AD conversion unit 107 can be made insusceptible to fluctuation in the potential of the GND potential supply line 103 due to the accumulation operation of the photo diode 104 in the AD conversion period.

In the present exemplary embodiment, an example of the AD conversion unit has been described above based on a configuration that compares a signal output from a conversion unit for generating charges based on incident rays with a ramp signal. A successive-approximation type AD conversion unit or a flash AD conversion unit, for example, may be used as another configuration. Such an AD conversion unit is driven by the voltage stored in the capacitance element 109 to allow acquiring the effect similar to that of the imaging apparatus according to the present exemplary embodiment.

In the present exemplary embodiment the configuration has been described as change in potential depending on the time of the reference signal is in a slope shape However, the reference signal changing in a step shape may be used. The reference signal whose potential changes in a step shape is also an example of the reference signal whose potential changes depending on time.

In the present exemplary embodiment, the configuration has been described in which one node of the capacitance element 109 is electrically connected to the control node of the MOS transistor M2 of the comparator 140. However, the present exemplary embodiment is not limited to the configuration. Such a configuration that the AD conversion unit 107 is driven based on the voltage stored in the capacitance element 109 may be employed. For example, such a configuration is considered that the capacitance element 109 stores the voltage based on the potential of the GND potential supply line 103 with the charge of the photo diode 104 reset. The AD conversion unit 107 performs the AD conversion operation based not on the potential of the GND potential supply line 103 but on the voltage stored in the capacitance element 109. This enables the AD conversion unit 107 to be insusceptible to fluctuation in the potential of the GND potential supply line 103. More specifically, such a configuration may be employed in which the capacitance element 109 stores the voltage based on the potential of the GND potential supply line 103, and the AD conversion unit 107 may operate based on the voltage based on the voltage stored in the capacitance element 109. Even if the charge of the photo diode 104 is not reset, the capacitance element 109 may store the voltage based on the potential of the GND potential supply line 103. After the reset period illustrated in FIG. 2B is ended, the AD conversion unit 107 performs the AD conversion. The signal generated by the AD conversion is referred to as digital N signal. The capacitance element 109 stores the voltage based on the potential of the GND potential supply line 103 when or before the AD conversion is performed. After that, the AD conversion unit 107 performs AD conversion on the signal based on the charge generated by the photoelectric conversion of the photo diode 104 on the basis of the voltage stored in the capacitance element 109. The signal generated by the AD conversion is written as a digital S signal. The memory unit 113 stores the digital N signal and the digital S signal, and outputs the signals to the signal storage unit 500. For example, the output unit 600 outputs a signal in which the digital N signal is subtracted from the digital S signal outside of the imaging apparatus. This enables reducing the influence of a characteristic dispersion for each comparator 140 on the signal output outside of the imaging apparatus. If the AD conversion unit 107 is driven by the potential of the GND potential supply line 103, the AD conversion for the digital N signal and the digital S signal may fluctuate the potential of the GND potential supply line 103. In this case, even if the digital N signal is subtracted from the digital S signal, the influence of fluctuation in the potential of the GND potential supply line 103 remains, so that AD conversion accuracy is lowered. On the other hand, the capacitance element 109 stores the voltage based on the potential of the GND potential supply line 103 when or before the AD conversion is performed to generate the digital N signal. The AD conversion for the digital S signal is performed by the voltage stored in the capacitance element 109. Since the AD conversion unit 107 is driven by a common voltage at the AD conversion for both the digital S signal and the digital N signal, so that the digital N signal can be subtracted favorably from the digital S signal.

In the present exemplary embodiment, a configuration has been described in which the capacitance element stores the voltage based on the potential of the bias line. The voltage based on the potential of the bias line includes voltage provided by the bias line via a resistance element or other capacitance elements if the resistance element or the other capacitance elements are included in an electrical path between the bias line and the capacitance element.

In the present exemplary embodiment, the bias circuit 201 is provided for each row of the pixels 101. The present exemplary embodiment is not limited to the configuration. The bias circuit 201 may be provided for each column of the pixels 101.

The photo diode 104 is an example of the conversion unit for generating charges based on the incident rays. The conversion unit for generating charges based on the incident rays may be the one for generating charges based on the incident rays such as X rays or infrared rays, for example.

An imaging apparatus according to a second exemplary embodiment is described below with reference to the attached drawings while focusing on the differences from the first exemplary embodiment.

Figure 3A:
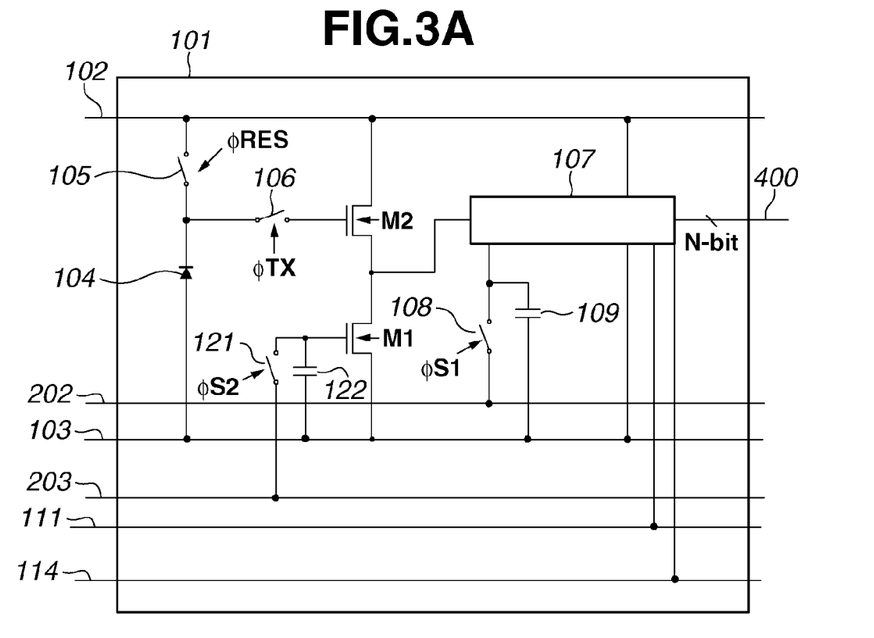
FIG. 3A illustrates another example of a configuration of the pixel.

FIG. 3A is a diagram illustrating an example of a configuration of the pixel 101 according to the present exemplary embodiment. In FIG. 3A, the components similar in function to those of the imaging apparatus described referring to FIG. 1B are given the same reference numerals and characters as those in FIG. 1B. The pixel 101 in FIG. 3A includes a buffer circuit including the MOS transistors M1 and M2. The buffer circuit according to the present exemplary embodiment is an example of an amplifier circuit. Charges output from the photo diode 104 via the switch 106 are given to the control node of the MOS transistor M2. One main node of the MOS transistor M2 is electrically connected to the power supply voltage supply line 102. The other main node of the MOS transistor M2 is electrically connected to the MOS transistor M1. A signal is output to the AD conversion unit 107 from a node provided on an electrical path between the MOS transistors M1 and M2. The signal output to the AD conversion unit 107 is the one based on charges generated by the photo diode 104. One node of a capacitance element 122 and one node of a switch 121 are electrically connected to the control node of the MOS transistor M1. The other node of the capacitance element 122 is electrically connected to the GND potential supply line 103. The other node of the switch 121 is electrically connected to a third bias line 203. The switch 121 conducts while a signal φS2 output from a timing generator (not illustrated) is in H level, and does not conduct while the signal φS2 is in L level. The AD conversion unit 107 may be similar in configuration to that in FIG. 2A. The capacitance element 122 is a second capacitance element according to the present exemplary embodiment. The switch 121 is a second switch according to the present exemplary embodiment.

The operation of the imaging apparatus illustrated in FIG. 3A may be similar to that illustrated in FIG. 2B. The signal φS2 may be similar in operation to the signal φS1.

In the present exemplary embodiment, a buffer circuit is provided on an electrical path between the photo diode 104 and the AD conversion unit 107 to adjust the driving force of the buffer according to an input load on the AD conversion unit 107. The photo diode 104 is separated from the AD conversion unit 107 to prevent noises caused by the operation of the AD conversion unit 107 from being input to the photo diode 104.

In the present exemplary embodiment, the buffer circuit is electrically connected to the GND potential supply line 103 to which the photo diode 104 and the AD conversion unit 107 are electrically connected in common. In the imaging apparatus according to the present exemplary embodiment, the capacitance element 122 stores the voltage based on the potential difference between the third bias line 203 and the GND potential supply line 103. The buffer circuit is driven by the voltage stored in the capacitance element 122 and the potential of the GND potential supply line 103. This fluctuates also the potential of the control node of the MOS transistor M1 according to fluctuation in the potential of the GND potential supply line 103. This makes it less likely to cause fluctuation in the voltage between the gate and the source of the MOS transistor M1. This enables the buffer circuit to be insusceptible to fluctuation in the potential of the GND potential supply line 103.

In the present exemplary embodiment, the signals φS1 and φS2 are described to have a similar waveform, the signals φS1 and φS2 may have a different waveform. The signal φS2 is set to L level from H level before the AD conversion period starts. Thus, the buffer circuit can be insusceptible to fluctuation in the potential of the GND potential supply line 103 due to the accumulation operation of the photo diode 104 in the AD conversion period.

In the present exemplary embodiment, the buffer circuit including the MOS transistors M1 and M2 is described as an example of an amplifier circuit. As another configuration of the amplifier circuit, for example, there may be a differential amplifier to the inverting node of which the signal of the photo diode 104 is applied and to the non-inverting node of which a reference potential is applied. The reference potential may be provided by the voltage stored in the capacitance element 122 and the potential of the GND potential supply line 103. In other words, in the imaging apparatus of the present exemplary embodiment, the amplifier may be driven by the voltage stored in the capacitance element 122 and the potential of the GND potential supply line 103.

In the present exemplary embodiment, the bias line 202 being the second bias line and the third bias line 203 are separately provided but the second and third bias lines may be commonly provided. Alternatively, a common potential may be applied to the bias line 202 and the third bias line 203.

An imaging apparatus according to a third exemplary embodiment is described below with reference to the attached drawings while focusing on the differences between the first and third exemplary embodiments. The imaging apparatus according to the present exemplary embodiment is different in the configuration of the AD conversion unit 107 from that of the first exemplary embodiment.

Figure 3B:
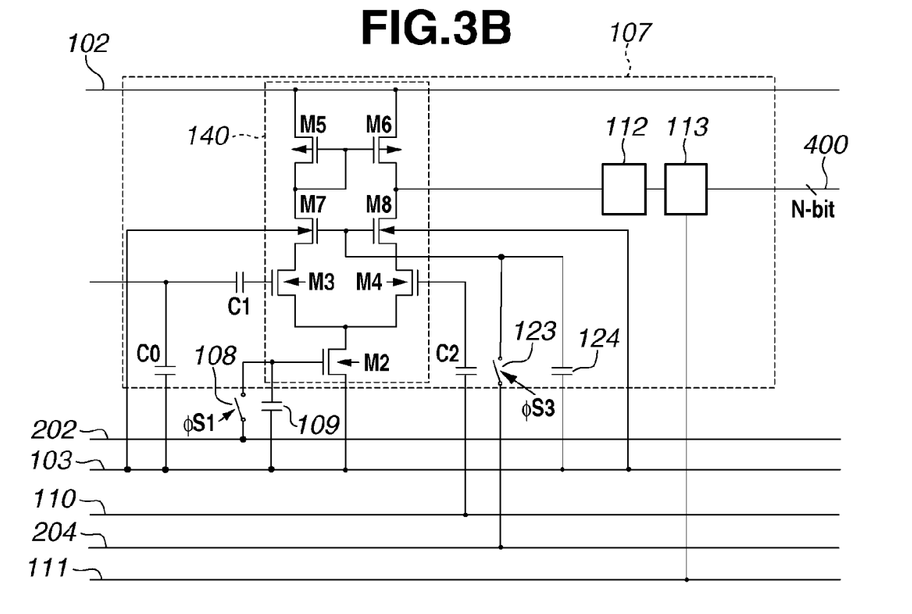
FIG. 3B illustrates an example of a configuration of an AD conversion unit.

FIG. 3B is a schematic diagram illustrating an example of a configuration of the AD conversion unit 107 included in the pixel 101 according to the present exemplary embodiment.

The comparator 140 of the AD conversion unit 107 according to the present exemplary embodiment includes MOS transistors M7 and M8 which are gain adjustment transistors for adjusting the gain of the comparator 140.

The back gates of the MOS transistors M7 and M8 according to the present exemplary embodiment are electrically connected to the GND potential supply line 103. The control nodes of the MOS transistors M7 and M8 are electrically connected to one node of a switch 123 and one node of a capacitance element 124.

The other node of the switch 123 is electrically connected to a fourth bias line 204. The other node of the capacitance element 124 is electrically connected to the GND potential supply line 103. The switch 123 conducts while a signal φS3 output from a timing generator (not illustrated) is in H level, and does not conduct while the signal φS3 is in L level. The capacitance element 124 is a third capacitance element according to the present exemplary embodiment. The switch 123 is a third switch according to the present exemplary embodiment.

The operation of the imaging apparatus illustrated in FIG. 3B can be similar to that illustrated in FIG. 2B. The signal φS3 can be similar in operation to the signal φS1.

The following problem arises when the control nodes of the MOS transistors M7 and M8 are always connected to the fourth bias line 204 and fluctuation in the potential of the GND potential supply line 103 causes the potential of the back gates of the MOS transistors M7 and M8 to change. If the potential of the control nodes of the MOS transistors M7 and M8 is constant, fluctuation in the potential of the back gates of the MOS transistors M7 and M8 causes the potential difference between the control nodes and the back gates of the MOS transistors M7 and M8 to fluctuate. This also changes the operation points of the MOS transistors M7 and M8. Consequently, the accuracy of comparison operation of the comparator 140 is lowered.

In the present exemplary embodiment, the control codes of the MOS transistors M7 and M8 are electrically connected via the capacitance element 124 to the GND potential supply line 103 which is electrically connected to the photo diode 104 and the MOS transistor M2. The MOS transistors M7 and M8 are driven by the voltage stored in the capacitance element 124 and the potential of the GND potential supply line 103. The back gates of the MOS transistors M7 and M8 are electrically connected to the GND potential supply line 103. The potential of the control nodes of the MOS transistors M7 and M8 also fluctuates according to fluctuation in the potential of the back gates of the MOS transistors M7 and M8 caused by fluctuation in the potential of the GND potential supply line 103. Therefore, even if the potential of the GND potential supply line 103 fluctuates, the potential difference between the control nodes and the back gates of the MOS transistors M7 and M8 is less likely to fluctuate. Accordingly, the operation points of the MOS transistors M7 and M8 are less likely to change. As a result, the accuracy of comparison operation of the comparator 140 is less likely to lower.

In the present exemplary embodiment, a configuration has been described in which the MOS transistors M7 and M8 are n-channel metal oxide semiconductors (NMOS). If the MOS transistors M7 and M8 are p-channel metal oxide semiconductors (PMOS), the node of the capacitance element 124 which is electrically connected to the GND potential supply line 103 in FIG. 3B has only to be electrically connected to the power supply voltage supply line 102.

If the signals φS1 and φS2 are kept at H level during the AD conversion period, the capacitance elements 109 and 124 can be operated as a filter for reducing noise in the bias line 202 and the GND potential supply line 103. Therefore, at a frame rate in which a standby period can be provided during which fluctuation in the potential of the GND potential supply line 103 converges, the capacitance elements 109 and 124 are operated as a filter with the signals φS1 and φS2 kept at H level. On the other hand, at a frame rate in which a standby period is difficult to provide during which fluctuation in the potential of the GND potential supply line 103 converges, as described in the present exemplary embodiment, the voltage based on the potential difference between the bias line 202 and the GND potential supply line 103 has only to be stored in the capacitance elements 109 and 124. More specifically, a configuration may be adopted in which the imaging apparatus is operated in such a manner that a mode is selected from a mode group including a mode for causing the comparator 140 to compare a signal output by the photo diode 104 with the reference signal with the switch 123 caused to conduct and then not to conduct, and a mode for causing the comparator 140 to compare the signal output from the photo diode 104 with the reference signal with the switch 123 kept conductive.

An imaging apparatus according to a fourth exemplary embodiment is described below while focusing on the differences from the first exemplary embodiment.

Figure 4A:
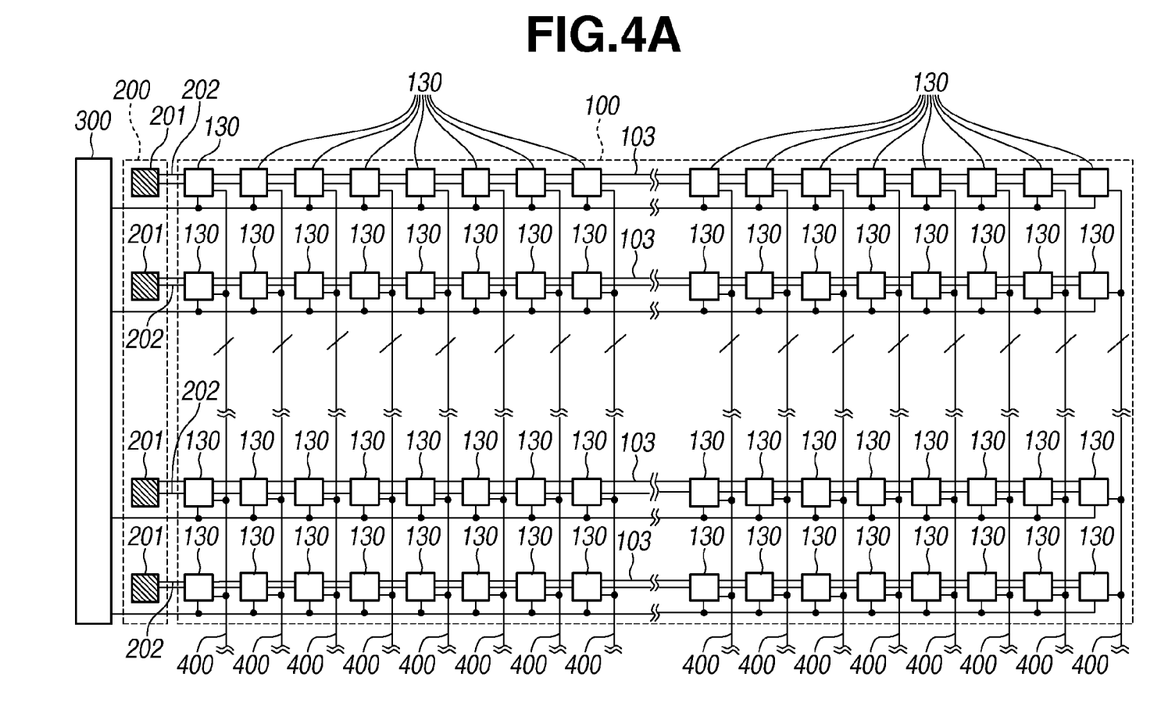
FIG. 4A illustrates an example of an imaging apparatus.

FIG. 4A is an example of a configuration of an imaging apparatus according to the present exemplary embodiment. In the present exemplary embodiment, there is provided a plurality of rows and columns of pixel cells 130 each including a plurality of pixels 101. A vertical control circuit 300 scans each row of the pixel cells 130. A bias circuit 201 is arranged for each row of the pixel cells 130. One column of the pixel cells 130 is provided with N×M output lines 400 illustrated in FIG. 4A, which is product of a bit number N of a signal output from the pixel cell 130 and the number of columns M of the pixel 101 in the pixel cell 130.

Figure 4B:
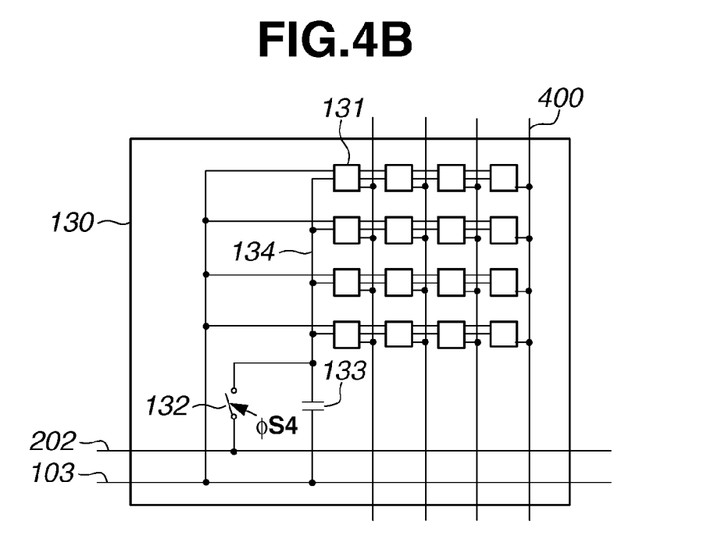
FIG. 4B illustrates an example of a configuration of a pixel cell.

FIG. 4B illustrates one of the pixel cells 130 illustrated in FIG. 4A. The pixel cell 130 is provided with a plurality of rows and columns of pixels 131. The plurality of pixels 131 is electrically connected to a fifth bias line 134 in common. One node of the capacitance element 133 is electrically connected to the fifth bias line 134 and one node of a switch 132. The other node of the switch 132 is electrically connected to a bias line 202. The switch 132 conducts while a signal φS4 output from a timing generator (not illustrated) is in H level, and does not conduct while the signal φS2 is in L level. The other node of the capacitance element 133 is electrically connected to the GND potential supply line 103.

Figure 4C:
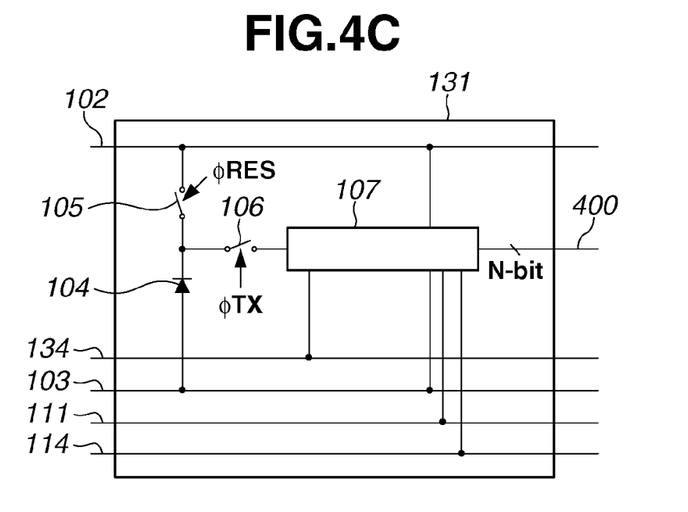
FIG. 4C illustrates an example a configuration of a pixel.

FIG. 4C illustrates a configuration of the pixel 131 according to the present exemplary embodiment. In FIG. 4C, the components similar in function to those of the imaging apparatus described in FIG. 1B are given the same reference numerals and characters as those in FIG. 1B. The fifth bias line 134 is electrically connected to the AD conversion unit 107. The signals φRES and φTX illustrated in FIG. 4C can be similar in operation to those illustrated in FIG. 2A. The AD conversion unit 107 is driven by the voltage stored in the capacitance element 133 and the potential of the GND potential supply line 103.

It is desirable that the signal φS4 is set to L level from H level before the signal φRES in the pixel cell 130 is set to H level. This is because the signal φS4 is set to L level from H level to enable the capacitance element 133 to store the voltage based on the potential difference between the bias line 202 and the GND potential supply line 103 with a little fluctuation in the potential of the GND potential supply line 103. The imaging apparatus according to the present exemplary embodiment includes the capacitance element 133 storing the voltage based on the potential difference between the bias line 202 and the GND potential supply line 103. This fluctuates the potential of the fifth bias line 134 according to fluctuation in the potential of the GND potential supply line 103 caused by the operation of the photo diode 104. Therefore, the potential difference between the fifth bias line 134 and the GND potential supply line 103 is less likely to fluctuate. Consequently, the imaging apparatus according to the present exemplary embodiment can also acquire the effect similar to that in the first exemplary embodiment.

In the imaging apparatus according to the present exemplary embodiment, a number of the capacitance element for storing the voltage based on the potential difference between the bias line and the GND potential supply line, arranged corresponding to a plurality of pixels 131 is one. This enables a circuit scale to be smaller than that of the imaging apparatus according to the first exemplary embodiment because of reducing the number of the capacitance elements for storing the voltage based on the potential difference between the bias line and the GND potential supply line and of switching elements for controlling the signal storage operation of the capacitance element.

The pixel 131 according to the present exemplary embodiment may include the buffer circuit and the capacitance element 122 described in the second exemplary embodiment. As described in the third exemplary embodiment, if the AD conversion unit 107 according to the present exemplary embodiment includes the comparator 140 and the MOS transistors M7 and M8 for adjusting a gain, the capacitance element 124 may be provided.

Figure 5:
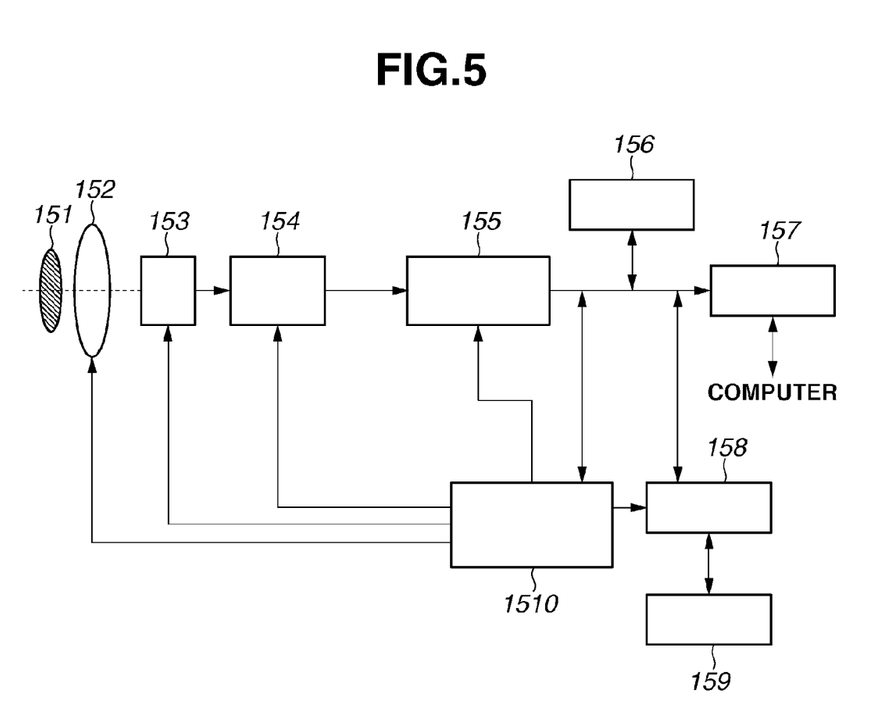
FIG. 5 illustrates an example of an imaging system.

FIG. 5 illustrates an imaging system with the imaging apparatus according to the first to fourth exemplary embodiments.

In FIG. 5, the imaging system includes a barrier 151 for protecting a lens, a lens 152 for forming an optical image of an object on an imaging device 154, and a diaphragm 153 for controlling the amount of light passing through the lens 152. Furthermore, the imaging system includes an output signal processing unit 155 for processing a signal output from the imaging device 154. The signal output from the imaging apparatus 154 is an image signal for generating an image obtained by capturing an object. The output signal processing unit 155 subjects the image signal output from the imaging device 154 to various corrections and compressions as required to generate an image. The lens 152 and the diaphragm 153 are an optical system for concentrating light on the imaging apparatus 154.

The imaging system illustrated in FIG. 5 further includes a buffer memory unit 156 for temporarily storing image data and an external interface unit 157 for communicating with external computer. The imaging system still further includes a detachable recording medium 159 such as a semiconductor memory for recording and reading image data, and a recording medium control interface unit 158 for performing recording or reading on the recording medium 159. The imaging system still further includes an entire control calculation unit 1510 for controlling various calculations and the entire digital still camera.

The imaging device 154 included in the imaging system illustrated in FIG. 5 may have the configuration described in the first to fourth exemplary embodiments. This enables acquiring the effects described in the first to fourth exemplary embodiments also in the imaging device 154 included in the imaging system in FIG. 5.

The present invention can provide the imaging apparatus, the imaging system, and a method for driving the imaging apparatus in which fluctuation in the potential of the bias line caused by the operation of the conversion unit for generating charges based on incident rays is less likely to affect the operation of the AD conversion unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-035882 filed Feb. 26, 2013, which is hereby incorporated by reference herein in its entirety.

What is claimed is:

1. An imaging apparatus comprising:
a pixel including a conversion unit configured to generate an electric charge based on an incident ray and an AD conversion unit configured to convert a signal based on the electric charge generated by the conversion unit into a digital signal; a first bias line electrically connected to the conversion unit; a capacitance element configured to store a voltage based on a potential applied to the first bias line, wherein the AD conversion unit is driven by the voltage stored in the capacitance element;
a second bias line to which a potential different from the potential applied to the first bias line is applied, wherein the voltage stored in the capacitance element is a voltage based on a potential difference between the potentials applied to the first and second bias lines; and a switch,
wherein the capacitance element stores the voltage based on the potential difference between a first and a second nodes of the capacitance element, the first node is electrically connected to the AD conversion unit, the second node is electrically connected to the first bias line, and the switch is configured to select a conduction state or a non-conduction state between the first node and the second bias line.

2. The imaging apparatus according to claim 1, further comprising a plurality of pixels, wherein the first node of the capacitance element is electrically connected to each of the AD conversion units of the plurality of pixels.

3. The imaging apparatus according to claim 1,
wherein the AD conversion unit includes a comparator,
wherein the comparator includes a first input transistor supplied with a signal output from the conversion unit, a second input transistor supplied with a reference signal, and a current supply transistor supplying current to the first and second input transistors,
wherein the comparator outputs a comparison result signal indicating a result of comparing a potential of the first input transistor with a potential of the second input transistor, and
wherein the first node of the capacitance element is electrically connected to a control node of the current supply transistor and a first main node of the current supply transistor is electrically connected to the first bias line, and a second main node of the current supply transistor is electrically connected to the first and second input transistors.

4. The imaging apparatus according to claim 2,
wherein the AD conversion unit includes a comparator,
wherein the comparator includes a first input transistor supplied with a signal output from the conversion unit, a second input transistor supplied with a reference signal, and a current supply transistor supplying current to the first and second input transistors,
wherein the comparator outputs a comparison result signal indicating a result of comparing a potential of the first input transistor with a potential of the second input transistor,
wherein the first node of the capacitance element is electrically connected to a control node of the current supply transistor and a first main node of the current supply transistor is electrically connected to the first bias line, and a second main node of the current supply transistor is electrically connected to the first and second input transistors.

5. The imaging apparatus according to claim 3,
wherein the comparator includes a gain adjustment transistor configured to adjust a gain of the comparator,
wherein the imaging apparatus includes a third capacitance element, a fourth bias line, and a third switch,
wherein a first node of the third capacitance element is electrically connected to the gain adjustment transistor, and a second node of the third capacitance element is electrically connected to the first bias line, and
wherein the third switch is configured to select a conduction state or a non-conduction state between the first node of the third capacitance element and the fourth bias line.

6. The imaging apparatus according to claim 4,
wherein the comparator includes a gain adjustment transistor configured to adjust a gain of the comparator,
wherein the imaging apparatus includes a third capacitance element, a fourth bias line, and a third switch,
wherein a first node of the third capacitance element is electrically connected to the gain adjustment transistor, and a second node of the third capacitance element is electrically connected to the first bias line, and
wherein the third switch is configured to select a conduction state or a non-conduction state between the first node of the third capacitance element and the fourth bias line.

7. The imaging apparatus according to claim 1, wherein a ground voltage is applied to the first bias line.

8. An imaging apparatus comprising:
a pixel including a conversion unit configured to generate an electric charge based on an incident ray and an AD conversion unit configured to convert a signal based on the electric charge generated by the conversion unit into a digital signal;
a first bias line electrically connected to the conversion unit;
a capacitance element configured to store a voltage based on a potential applied to the first bias line, wherein the AD conversion unit is driven by the voltage stored in the capacitance element;
a second bias line to which a potential different from the potential applied to the first bias line is applied, wherein the voltage stored in the capacitance element is a voltage based on a potential difference between the potentials applied to the first and second bias lines; and
an amplifier circuit provided on an electrical path between the conversion unit and the AD conversion unit, a second capacitance element, a third bias line, and a second switch,
wherein a first node of the second capacitance element is electrically connected to the amplifier circuit, and a second node of the second capacitance element is electrically connected to the first bias line, and
wherein the second switch is configured to select a conduction state or a non-conduction state between the first node of the second capacitance element and the third bias line.

9. The imaging apparatus according to claim 8,
wherein a common potential is applied to the second and third bias lines.

10. An imaging system comprising: an imaging apparatus comprising: a pixel including a conversion unit configured to generate an electric charge based on an incident ray and an AD conversion unit configured to convert a signal based on the electric charge generated by the conversion unit into a digital signal; a first bias line electrically connected to the conversion unit; a capacitance element configured to store a voltage based on a potential applied to the first bias line, wherein the AD conversion unit is driven by the voltage stored in the capacitance element; a second bias line to which a potential different from the potential applied to the first bias line is applied, wherein the voltage stored in the capacitance element is a voltage based on a potential difference between the potentials applied to the first and second bias lines; and a switch, wherein the capacitance element stores the voltage based on the potential difference between a first and a second nodes of the capacitance element, the first node is electrically connected to the AD conversion unit, the second node is electrically connected to the first bias line, and the switch is configured to select a conduction state or a non-conduction state between the first node and the second bias line; and a signal processing unit configured to process a signal output from the imaging apparatus.

11. A method for driving the imaging apparatus, which includes a pixel including a conversion unit configured to generate an electric charge based on an incident ray and an AD conversion unit configured to convert a signal based on the electric charge generated by the conversion unit into a digital signal, a first bias line configured to apply a common potential to the conversion unit and the AD conversion unit, and a capacitance element, the method comprising:
  storing a voltage in the capacitance element based on a potential applied to the first bias line, and
  driving the AD conversion unit based on the voltage stored in the capacitance, wherein the imaging apparatus further includes a switch and a second bias line to which a potential different from the potential applied to the first bias line is applied, a first node of the capacitance element is electrically connected to the AD conversion unit, a second node of the capacitance element is electrically connected to the first bias line, and the switch is configured to select a conduction state or a non-conduction state between the first and second bias lines, an amplifier circuit configured to output a signal based on the signal output from the conversion unit to the AD conversion unit, a second capacitance element, and a third bias line, the method further comprising:
  operating the imaging apparatus by selecting a mode from a mode group including a mode of resetting the potential of the conversion unit after the switch is brought into a non-conduction state from a conduction state, and a mode of resetting the potential of the conversion unit with the switch kept conductive;
  storing a voltage in the second capacitance element based on a potential difference between the first and third bias lines, and
  driving the amplifier circuit by the voltage stored in the second capacitance element and the potential of the first bias line.

12. The method for driving the imaging apparatus according to claim 11, the method further comprising:
  supplying a same potential to the second and third bias lines.

13. A method for driving the imaging apparatus, which includes a pixel including a conversion unit configured to generate an electric charge based on an incident ray and an AD conversion unit configured to convert a signal based on the electric charge generated by the conversion unit into a digital signal, a first bias line configured to apply a common potential to the conversion unit and the AD conversion unit, and a first capacitance element, the method comprising:
  storing a voltage in the first capacitance element based on a potential applied to the first bias line, and
  driving the AD conversion unit based on the voltage stored in the first capacitance element, wherein AD conversion unit includes a comparator configured to output a comparison result signal indicating a result of comparing the signal output from the conversion unit with a reference signal, and a memory unit configured to store a digital signal based on the comparison result signal, wherein the comparator includes a transistor configured to adjust a gain of the comparator, and wherein the imaging apparatus further includes a third capacitance element and a fourth bias line, the method further comprising:
  driving the comparator by the voltage stored in the first capacitance element and the potential of the first bias line;
  storing a voltage in the third capacitance element based on a potential difference between the first and fourth bias lines, and
  driving the transistor by the voltage stored in the third capacitance element and the potential of the first bias line.

14. The method for driving the imaging apparatus according to claim 13, wherein the imaging apparatus further includes a third switch, a first node of the third capacitance element is electrically connected to the transistor, a second node of the third capacitance element is electrically connected to the first bias line, and the third switch is configured to select a conduction state or a non-conduction state between the first node of the third capacitance element and the fourth bias line, the method further comprising:
  operating the imaging apparatus by selecting a mode from a mode group including a mode in which the comparator is caused to compare the signal output from the conversion unit with the reference signal after the third switch is brought into a non-conduction state from a conduction state, and a mode in which the comparator is caused to compare the signal output from the conversion unit with the reference signal with the third switch kept conductive.

15. The method for driving the imaging apparatus according to claim 13,
  wherein the AD conversion unit performs analog-to-digital conversion on the signal output from the conversion unit into the digital signal after the first capacitance element is caused to store the voltage.

* * * * *